United States Patent Office 3,766,241
Patented Oct. 16, 1973

3,766,241
REMOVAL OF METAL CATIONS FROM SOLUTION IN NITRILES
William Charles Drinkard, Jr., Wilmington, Del., assignor to E. I. du Pont de Nemours and Company, Wilmington, Del.
No Drawing. Filed May 26, 1971, Ser. No. 147,212
Int. Cl. C07c *121/04*
U.S. Cl. 260—465.8 R                                      6 Claims

ABSTRACT OF THE DISCLOSURE

The invention comprises a method for removing metal cations from solution in nitriles by contacting such solutions with anhydrous ammonia. The method is particularly useful for purification of product streams in the hydrocyanation of olefins to produce nitriles.

BACKGROUND OF THE INVENTION

The invention relates to a process for removing the cations of soluble metal salts from liquid organic nitrile compounds. Such metal salts are used as promoters in the hydrocyanation of olefins to produce nitriles and dinitriles, as described, for example, in U.S. Pat. No. 3,496,217, issued Feb. 17, 1970, to Drinkard and Kassal. As set forth in that patent, a process for the hydrocyanation of nonconjugated, ethylenically unsaturated organic compounds may use certain nickel complexes such as a tetrakis (triaryl phosphite) nickel (O) as a catalyst, and metal salts such as halides of zinc, cadmium, titanium, tin, chromium, iron, cobalt, etc., as promoters for the reaction. These metal salts pose a purification problem, since the nitriles produced by the process may have a polar molecular structure precluding aqueous extraction of the salts. It has been found that this problem may be solved by contacting the nitrile-metal salt solution with ammonia so as to form an insoluble complex which may be filtered, settled, or otherwise separated from the liquid nitrile. While complexing metal salts with ammonia is known generally (see, for example, French Pat. No. 2,006,764), it is surprising that the reaction takes place as quickly as it does and requires only a small quantity of ammonia to complex the metal salt. It was also unexpected that the complex thus formed would be insoluble in the polar nitrile compounds and easily removable therefrom. Removal of metal cations in accordance with the invention may be employed to improve the product yield of the above mentioned hydrocyanation process, as described hereinafter.

SUMMARY OF THE INVENTION

The invention is a method of removing metal salts from solution in nitriles comprising contacting with anhydrous ammonia a solution of a metal salt in a liquid organic nitrile compound or mixture of nitrile compounds, preferably followed by separation of the insoluble ammonia-metal salt complex thus formed. Convenient methods for effecting the separation include settling, filtration, and centrifugation.

The method of the invention is particularly useful for continuous purification of product streams in the hydrocyanation of olefins to produce nitriles, since an insoluble complex forms immediately on contact with the ammonia, and only a small quantity of ammonia is required to complex the metal salt. The complex is easily filtered out or removed by other means.

DETAILED DESCRIPTION

The organic nitrile compounds of the method of the invention are liquid at room temperature and preferably have from 2 to 18 carbon atoms; they may be aryl or alkyl, substituted or unsubstituted, and may or may not have unsaturation. They must, of course, have at least one cyano (—CN) group. Such compounds include, for example, adiponitrile, 2-methylglutaronitrile, ethylsuccinonitrile, pentenenitrile isomers (i.e., cis and trans 2-pentenenitrile, cis and trans 3-pentenenitrile, and 4-pentenenitrile), 2 - methyl - 3 - butenenitrile, 2 - methyl - 2 - butenenitrile, acetonitrile, and benzonitrile.

The metal salts soluble in such compounds and removable therefrom in accordance with the invention include salts of zinc, cadmium, beryllium, aluminum, gallium, indium, silver, titanium, zirconium, hafnium, germanium, tin, vanadium, niobium, scandium, chromium, molybdenum, tungsten, manganese, rhenium, palladium, thorium, erbium, iron, yttrium, cobalt, and nickel. The anion portion of the salts may be any of the halides (i.e., fluoride, chloride, bromide, and iodide); anions of lower fatty acids having from 2 to 7 carbon atoms, $HPO_3^{-2}$, $H_2PO_2^-$, $CF_3COO^-$, $OSO_2C_7F_{15}^-$, and $SO_4^{-2}$, etc. Such metal salts are further described in U.S. Pat. No. 3,496,217, issued Feb. 17, 1970, to Drinkard and Kassal, col. 4, lines 7-38, wherein they are referred to as promoters in the hydrocyanation of olefins.

As shown in the examples, the contacting may be effected by simply providing an ammonia atmosphere over the surface of the solution, preferably with the circulation of the ammonia. Alternatively, the ammonia may be bubbled through or dispersed in the solution. Formation of an insoluble complex of the ammonia with the Lewis acid metal salts occurs immediately. This complex may be separated from the solution by settling, filtration, centrifugation, or other procedures.

The method of the invention is particularly useful in precesses for manufacture of nitriles by hydrocyanation of olefins and, particularly, in the hydrocyanation of pentenenitriles with zero valent nickel complexes as catalysts and metal salt promoters to produce adiponitrile, as described in U.S. Pat. No. 3,496,217. In one such process, pentenenitriles, HCN, $Ni[P(OC_6H_5)_3]_4$, $P(OC_6H_5)_3$, and zinc chloride are introduced into a reactor vessel and are reacted to produce a product composed of 50–90% dinitriles (mainly adiponitrile), 5–40% unreacted pentenenitriles, 5–25% free and combined $P(OC_6H_5)_3$, 0–12% $Ni[P(OC_6H_5)_3]_4$, 0.1–0.5% dissolved zinc chloride, and solid catalyst residues which may contain nickel and zinc. This product may then be extracted with a hydrocarbon solvent to recover most of the $Ni[P(OC_6H_5)_3]_4$ and free $P(OC_6H_5)_3$, filtered to remove the solid catalyst residues, and contacted with commercial grade anhydrous ammonia by bubbling the ammonia through the product solution in a stirred reactor, tank, or column for a short time above or below room temperature and at atmospheric or elevated pressures. Alternatively, the product solution may be contacted with ammonia prior to extraction. After contacting with ammonia, the product is filtered to remove the insoluble complex of ammonia and zinc chloride and the rest of the solid catalysts residues. The clear zinc-free solution may then be distilled to separate the adiponitrile product. The method of the invention, as described above, reduces the corrosiveness of the product solution, reduces decomposition during distillation and undesired complexing of the adiponitrile and other nitriles and thereby may increase the yield of adiponitrile by 1 to 3%.

The method of the invention, as applied to solutions of various metal salts in various nitriles and mixtures thereof is illustrated by the following examples. Although the examples illustrate batchwise embodiments of the process it may be operated continuously by continuous addition of ammonia. Because the reaction of the metal salt with the ammonia is instantaneous, the precipitation depends on the rate of addition of ammonia.

Example I

A 100 ml. solution containing 0.26% by weight of zinc dissolved as zinc chloride and 0.08% by weight of dissolved nickel resulting from catalyst oxidation, in a mixture of adiponitrile, 2-methylglutaronitrile, ethylsuccinonitrile, pentenenitrile isomers and 2-methyl-3-butenenitrile isomers is treated with anhydrous ammonia gas by sweeping the ammonia across the surface of the solution for about one minute in an open 250 ml. glass flask while the liquid is shaken gently by hand. The solution becomes cloudy immediately on contact with the ammonia. Five grams of filter aid (Celite) are added to speed filtration and the mixture is filtered through a medium glass frit funnel. Analysis of the recovered clear liquid shows that it contains 0.3% zinc and less than 0.038% nickel.

Example II

Example I is repeated except that the filter aid is added before ammonia addition. Analysis of the clear recovered liquid shows the presence of 0.025% zinc and less than 0.039% nickel.

Example III

Anhydrous ammonia is bubbled into a solution comprising a mixture of nitriles, as described in Example I, and containing dissolved zinc and nickel. The ammonia addition is continued for 5 to 7 minutes. A grey precipitate forms and is filtered off on a medium frit glass filter. The solids, 257.5 g., and 2843 g. of filtrate are collected. The solids are analyzed at 4.8 weight percent nickel and 3.1 weight percent zinc, whereas, the liquid filtrate contains only 0.009% nickel and 0.015% zinc, representing 95% recovery of the zinc from the original solution.

Example IV

Anhydrous ammonia is bubbled into a solution comprising a mixture of nitriles, as described in Example I, and containing 0.317% dissolved zinc. The ammonia addition is continued at a rate of 0.20 g. ammonia per minute for 2 minutes. A precipitate forms and is filtered off, yielding a filtrate having 0.031% dissolved zinc. Addition of ammonia at the same rate for an additional 4 minutes and filtering yields a filtrate having 0.010% dissolved zinc.

Example V

A solution containing 0.91% by weight of cobalt dissolved in 3-pentenenitrile is treated with anhydrous ammonia gas. The ammonia is swept across the surface of the solution for about one minute in an open 100 ml. glass beaker while the liquid is shaken gently by hand. The solution becomes cloudy immediately on contact with the ammonia. The mixture is filtered through a medium glass frit funnel. Analysis of the recovered clear liquid shows that it contains less than 0.01% cobalt.

Example VI

A solution containing 0.65% by weight of tin dissolved in 3-pentenenitrile is treated with anhydrous ammonia gas. The ammonia is swept across the surface of the solution for about one minute in an open 100 ml. glass beaker while the liquid is shaken gently by hand. The solution becomes cloudy immediately on contact with the ammonia. The mixture was filtered through a medium glass frit funnel. Analysis of the recovered clear liquid shows that it contains less than 0.01% tin.

Example VII

A solution containing 0.65% by weight of iron dissolved in 2-methylglutaronitrile is treated with anhydrous ammonia gas. The ammonia is swept across the surface of the solution for about one minute in an open 100 ml. glass beaker while the liquid is shaken gently by hand. The solution becomes cloudy immediately on contact with the ammonia. One gram of filter-aid (Celite) is added to speed filtration and the mixture is filtered through a medium glass frit funnel. Analysis of the recovered clear amber liquid shows that it contains 0.09% iron.

Example VIII

A solution containing 0.42% by weight of palladium dissolved in acetonitrile is treated with anhydrous ammonia gas. The ammonia is swept across the surface of the solution for about one minute in an open 100 ml. glass beaker while the liquid is shaken gently by hand. The solution becomes cloudy immediately on contact with the ammonia. The mixture is filtered through a medium glass frit funnel. Analysis of the recovered clear liquid shows that it contains less than 0.01% palladium.

Example IX

A solution containing 0.33% by weight of yttrium dissolved in 2-methyl-3-butenenitrile is treated with anhydrous ammonia gas. The ammonia is swept across the surface of the solution for about one minute in an open 250 ml. glass flask while the liquid is shaken gently by hand. The solution becomes cloudy immediately on contact with the ammonia. The mixture is filtered through a medium glass frit funnel. Analysis of the recovered clear yellow liquid shows that it contains less than 0.01% yttrium.

Example X

A solution containing 0.16% by weight of chromium dissolved in adiponitrile is treated with anhydrous ammonia gas. The ammonia is swept across the surface of the solution for about one minute in an open 250 ml. glass flask while the liquid is shaken gently by hand. The solution becomes cloudy immediately on contact with the ammonia. Two grams of filter-aid (Celite) is added to speed filtration and the mixture is filtered through a medium glass frit funnel. Analysis of the recovered clear light-green liquid shows that it contains less than 0.01% chromium.

Example XI

A solution containing 0.22% by weight of thorium dissolved in benzonitrile is treated with anhydrous ammonia gas. The ammonia is swept across the surface of the solution for about one minute in an open 250 ml. glass flask while the liquid is shaken gently by hand. The solution becomes cloudy immediately on contact with the ammonia. Two grams of filter-aid (Celite) is added to speed filtration and the mixture was filtered through a medium glass frit funnel. Analysis of the recovered clear liquid shows that it contains less than 0.01% thorium.

Example XII

A solution containing 0.53% by weight of cobalt dissolved in acetonitrile is treated with anhydrous ammonia gas. The ammonia is swept across the surface of the solution for about one minute in an open 100 ml. glass beaker while the liquid is shaken gently by hand. The solution becomes cloudy immediately on contact with the ammonia. The mixture is filtered through a medium glass frit funnel. Analysis of the recovered clear liquid shows that it contains less than 0.01% cobalt.

Example XIII

A solution containing 0.62% by weight of zirconium dissolved in 2-methyl-3-butenenitrile is treated with anhydrous ammonia gas. The ammonia is swept across the surface of the solution for about one minute in an open 250 ml. glass flask while the liquid is shaken gently by hand. The solution becomes cloudy immediately on contact with the ammonia. Two grams of filter-aid (Celite) is added to speed filtration and the mixture is filtered through a medium glass frit funnel. Analysis of the recovered clear yellow liquid shows that it contains 0.05% zirconium.

Example XIV

A solution containing 0.12% by weight of vanadium dissolved in 2-methylglutaronitrile is treated with anhydrous ammonia gas. The ammonia is swept across the surface of the solution for about one minute in an open 250 ml. glass flask while the liquid is shaken gently by hand. The solution becomes cloudy immediately on contact with the ammonia. Two grams of filter-aid (Celite) is added to speed filtration and the mixture is filtered through a medium glass frit funnel. Analysis of the recovered clear yellow liquid shows that it contains less than 0.05% vanadium.

Example XV

A solution containing 0.41% by weight of aluminum dissolved in acetonitrile is treated with anhydrous ammonia gas. The ammonia is swept across the surface of the solution for about one minute in an open 250 ml. glass flask while the liquid is shaken gently by hand. The solution becomes cloudy immediately on contact with the ammonia. Two grams of filter-aid (Celite) is added to speed filtration and the mixture is filtered through a medium glass frit funnel. Analysis of the recovered clear liquid shows that it contains less than 0.01% aluminum.

The embodiments of the invention in which an exclusive property or privilege is claimed are defined as follows:

1. In a process of hydrocyanating a nonconjugated pentenenitrile by contacting the pentenenitrile with hydrogen cyanide in the presence of a zerovalent nickel complex of a triaryl phosphite and as a promoter a cation of a metal salt of the group consisting of zinc, cadmium, beryllium, aluminum, gallium, indium, silver, titanium, zirconium, hafnium, germanium, tin, vanadium, niobium, scandium, chromium, molybdenum, tungsten, manganese, rhenium, palladium, thorium, erbium, iron, yttrium, cobalt and nickel, to produce a product stream containing organic dinitriles derived from hydrocyanation of pentenenitriles, unreacted pentenenitriles, zerovalent nickel complex, triaryl phosphite, metal salt promoter and catalyst residue, the improvement which comprises contacting the product stream with anhydrous ammonia in amount sufficient to form an insoluble complex of ammonia with the metal salt contained therein and separating the insoluble ammonia complex from the product stream.

2. The process of claim 1 wherein the anion portion of the metal salt is of the group consisting of halides, anions of lower fatty acids having from 2 to 7 carbon atoms, $HPO_3^{-2}$, $H_2PO_2^-$, $CF_3COO^-$, $OSO_2C_7H_{15}^-$ and $SO_4^{-2}$.

3. The process of claim 2 wherein the metal salt has a cation of a metal of the group consisting of zinc, nickel, tin, chromium, iron, palladium, yttrium, thorium, zirconium, vanadium, aluminum and cobalt.

4. The process of claim 3 wherein the metal salt is a metal halide.

5. The process of claim 1 wherein the product stream contains zinc and nickel cations and is contacted with anhydrous ammonia.

6. The process of claim 5 wherein the product stream is continuously contacted with anhydrous ammonia.

References Cited

UNITED STATES PATENTS

| | | | |
|---|---|---|---|
| 3,519,674 | 7/1970 | Arad et al. | 260—465.8 A |
| 3,547,975 | 12/1970 | Arad et al. | 260—465.8 A |
| 3,496,215 | 2/1970 | Drinkard et al. | 260—465.9 X |
| 3,496,217 | 2/1970 | Drinkard et al. | 260—465.9 X |
| 3,496,218 | 2/1970 | Drinkard, Jr. | 260—465.9 X |

FOREIGN PATENTS

| | | | |
|---|---|---|---|
| 2,006,764 | 1/1970 | France | 260—465.1 |

JOSEPH PAUL BRUST, Primary Examiner

U.S. Cl. X.R.

260—465.9